(12) United States Patent
Eberson et al.

(10) Patent No.: US 6,188,184 B1
(45) Date of Patent: Feb. 13, 2001

(54) ELECTRONIC BALLAST WITH REDUCED OPERATING FREQUENCY AFTER LAMP IGNITION

(75) Inventors: Etienne N. K. P. M. Eberson; Antonius A. M. Marinus, both of Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/425,660

(22) Filed: Oct. 22, 1999

(30) Foreign Application Priority Data

Oct. 22, 1998 (EP) .................................................. 98203562

(51) Int. Cl.$^7$ ...................................................... G05F 1/00
(52) U.S. Cl. ..................... 315/307; 315/291; 315/209 R; 315/DIG. 5; 315/58
(58) Field of Search ................................ 315/209 R, 207, 315/209 CD, 237, 240, 241 R, 307, 308, 291, DIG. 5, 56–62, 71–74; 323/282, 224, 290, 351

(56) References Cited

U.S. PATENT DOCUMENTS

| | | | |
|---|---|---|---|
| 3,857,060 | * 12/1974 | Chermin | 315/99 |
| 5,581,161 | 12/1996 | Gong | 315/307 |
| 5,955,841 | * 9/1999 | Moisin et al. | 315/56 |
| 6,011,361 | * 1/2000 | Blankers | 315/307 |

OTHER PUBLICATIONS

U.S. Ser. No. 09/400,760, filed, Sep. 21, 1999.

* cited by examiner

*Primary Examiner*—Haissa Philogene
(74) *Attorney, Agent, or Firm*—Bernard Franzblau

(57) ABSTRACT

A ballast circuit for a compact fluorescent lamp includes a down-converter for operating the lamp with a DC current during stationary operation. First and second input terminals provide a DC supply voltage and first and second output terminals connect to the lamp. The down-converter has a first switch and a diode serially connected to the input terminals and an inductor coupled to the first switch and to one output terminal. A second switch is coupled to the output terminal. A control circuit operates the first switch at a high frequency. During the preheating and ignition phase, the down-converter is operated in the continuous mode and during stationary operation in the discontinuous mode by control of the switching frequency of the first switch.

22 Claims, 2 Drawing Sheets

ELECTRONIC BALLAST WITH REDUCED OPERATING FREQUENCY AFTER LAMP IGNITION

BACKGROUND OF THE INVENTION

This invention relates to a circuit arrangement for igniting and supplying a lamp with a DC current, comprising
input terminals for connection to terminals of a power supply source supplying a DC voltage,
a DC-DC converter coupled to the input terminals and provided with
an inductive element,
a unidirectional element,
a first switching element,
a control circuit coupled to a control electrode of the first switching element for rendering the first switching element conducting and non-conducting at a frequency f,
output terminals for connecting the lamp, and
a first circuit which connects the output terminals during operation and comprises a second switching element and means for rendering the second switching element conducting and non-conducting.

The invention also relates to a compact lamp.

A circuit arrangement as described in the opening paragraph is known from U.S. Pat. No. 5,581,161. In the known circuit arrangement, the DC-DC converter is constituted by a down-converter. The second switching element is conducting immediately after the known circuit arrangement is put into operation. The control circuit renders the first switching element conducting and non-conducting at a frequency f. During operation of the known circuit arrangement, both a first and a second lamp electrode form a part of the first circuit. The inductive element and the first circuit convey current during a first time interval, so that the electrodes of the lamp connected to the circuit arrangement are preheated. At the end of the first time interval, the second switching element is rendered non-conducting, so that the first circuit no longer conveys current. The inductive element subsequently generates an ignition voltage. After ignition of the lamp and during stationary operation, the control circuit renders the first switching element high-frequency conducting and non-conducting, and a lamp connected to the circuit arrangement is fed with a DC current supplied by the down-converter. Since the down-converter consists of only a small number of components, the known circuit arrangement can be manufactured relatively easily and thus also at a low cost.

The amplitude of the ignition voltage is dependent on the instantaneous amplitude of the current in the inductive element when the second switching element becomes non-conducting. In practice, the DC-DC converter is often operated in the discontinuous mode so as to limit switching losses. This means that the current through the inductive element in each period associated with the frequency f becomes substantially equal to zero during a given time interval. By rendering the first switching element conducting while the current in the inductive element is substantially zero, a considerable power dissipation in the unidirectional element is prevented so that the circuit arrangement has a relatively high efficiency. If the second switching element becomes non-conducting when the current in the inductive element is substantially zero or has a relatively low instantaneous amplitude, the energy present in the inductive element is insufficient to generate an ignition voltage with a sufficiently high amplitude. This problem could be solved by implementing the means for rendering the second switching element conducting and non-conducting in such a way that these means render the second switching element non-conducting when the instantaneous amplitude of the current in the inductive element has a relatively high value. Such an implementation of the means for rendering the second switching element conducting and non-conducting would, however, render the circuit arrangement relatively complicated and expensive.

SUMMARY OF THE INVENTION

It is an object of the invention to provide a relatively simple and, hence, low-cost circuit arrangement for igniting and supplying a lamp with a DC current, with which the lamp can be ignited in an efficient and reliable manner.

According to the invention, a circuit arrangement of the type described in the opening paragraph is therefore characterized in that the control circuit is provided with a circuit section I for decreasing the frequency f after ignition of the lamp.

A relatively high value of the frequency for igniting the lamp causes the DC-DC converter to be operated in the continuous mode in this phase of the lamp operation, and the current in the inductive element is constituted by the sum of a DC component having a relatively high amplitude and an AC component having a relatively low amplitude. At such a shape of the current in the inductive element, the instantaneous value of the amplitude of this current is high enough at any instant to generate an ignition pulse having a sufficiently high amplitude for igniting the lamp in the case when the second switching element becomes non-conducting at that instant.

By choosing the frequency f for igniting the lamp to be relatively high, it is also ensured that, if breakdown of the plasma of the lamp occurs during the period when the first switching element is non-conducting, this first switching element is rendered conducting again for only a relatively short time interval after the occurrence of the breakdown, so that the lamp can convey a current while the charge carriers formed by the breakdown are still present in the plasma. This results in a satisfactory take-over behavior of the lamp. After igniting the lamp, the circuit section I decreases the frequency f. The frequency f after ignition of the lamp may be chosen such that the DC-DC converter is operated in the discontinuous mode so that the switching losses during stationary supply of the lamp are relatively low. The highest efficiency is achieved if the current in the inductive element becomes zero for a very short time during each period associated with the frequency f. Since the time interval between the instant when the circuit arrangement is put into operation and the ignition of the lamp is often relatively short in practice, the switching losses occurring in the DC-DC converter upon operation in the continuous mode do not give rise to the occurrence of relatively high temperatures which might damage components of the DC-DC converter.

Satisfactory results have been obtained with embodiments of a circuit arrangement according to the invention, in which the DC-DC converter comprises a down-converter.

The unidirectional element may be realized in a relatively simple and, hence, low-cost manner if the unidirectional element comprises a diode.

It is possible to implement the second switching element as a semiconductor switching element and to realize the means for rendering this semiconductor switching element consecutively conducting and non-conducting with the aid of a second control circuit which is coupled to a control electrode of the semiconductor switching element. However, if the second switching element is implemented as a glow discharge starter, a separate control circuit is not necessary for realizing the consecutive conductance and non-conductance of the second switching element. The circuit arrangement thus comprises a relatively small number of components and can therefore be manufactured in a relatively simple way and at low cost.

To enhance the ignition behavior of a lamp operated by means of a circuit arrangement according to the invention, it is possible to implement the circuit arrangement in such a way that the first circuit comprises a lamp electrode during operation.

When the second switching element is conducting, the current flowing through the first circuit also flows through this lamp electrode so that it is preheated. Since the lamp is fed with a DC current after ignition, a considerable improvement of the ignition behavior can be achieved if only the lamp electrode, which constitutes the cathode of the lamp during stationary operation, is preheated.

It has been found that the circuit arrangement according to the invention is particularly suitable for use in the ballast circuit of a compact lamp comprising a light-transmissive discharge vessel having a filling comprising a rare-gas, and two electrodes, a lamp housing secured to the discharge vessel, a lamp cap having electric contacts and secured to the lamp housing, and a ballast circuit coupled between the contacts and the electrodes for generating a lamp current from a power supply voltage.

More particularly, a circuit arrangement according to the invention may be eminently used in the ballast circuit of a compact fluorescent lamp, or a lamp whose discharge vessel filling comprises mercury and in which a wall of the discharge vessel has a luminescent coating.

These and other aspects of the invention are apparent from and will be elucidated, by way of non-limitative example, with reference to the embodiment(s) described hereinafter.

DESCRIPTION OF THE PREFERRED EMBODIMENTS

Figure 1:
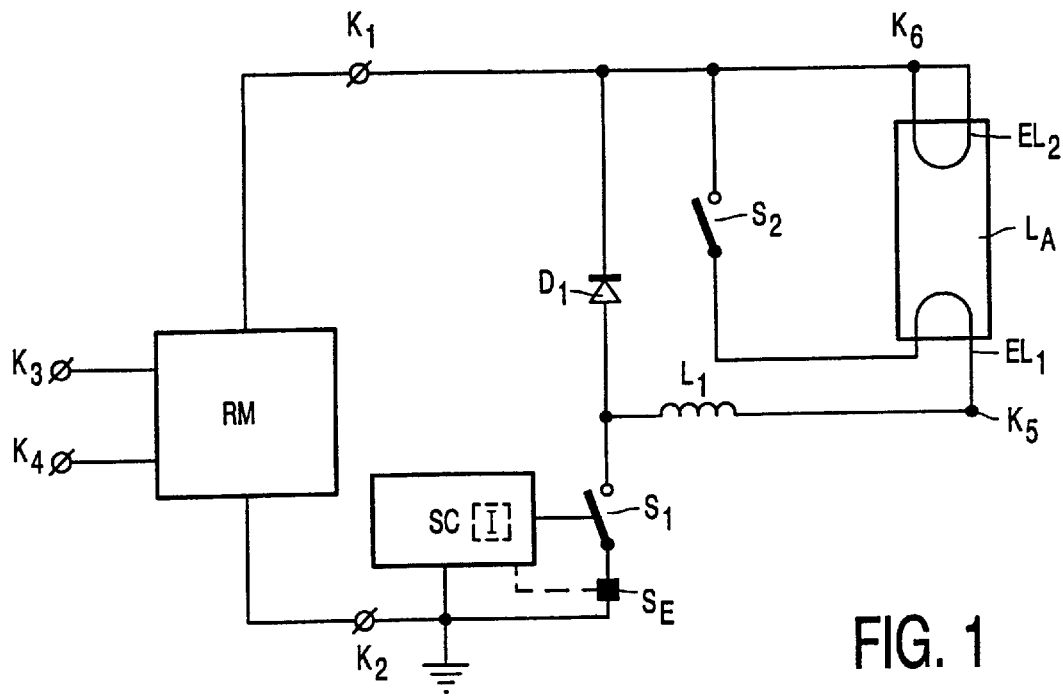
FIG. 1 shows diagrammatically an embodiment of a circuit arrangement according to the invention, with a lamp $L_A$ connected thereto.

In FIG. 1, the reference symbols $K_3$ and $K_4$ denote terminals for connection to an AC voltage source. Terminals $K_3$ and $K_4$ are connected to respective inputs of circuit section RM for generating a DC power supply voltage from an AC voltage supplied by the AC voltage source. $K_1$ and $K_2$ constitute input terminals for connection to the terminals of a power supply source supplying a DC voltage. In this embodiment, this power supply source is constituted by the AC voltage source together with the circuit section RM. Input terminals $K_1$ and $K_2$ are connected to respective output terminals of the circuit section RM. Input terminal $K_1$ is connected to input terminal $K_2$ by means of a series arrangement of a diode $D_1$, switching element $S_1$ and current sensor $S_E$. In this embodiment, diode $D_1$ constitutes a unidirectional element and switching element $S_1$ constitutes a first switching element. A control electrode of switching element $S_1$ is coupled to an output of a circuit section SC which constitutes a control circuit for rendering the first switching element $S_1$ conducting and non-conducting. Circuit section SC comprises a circuit section I for decreasing the frequency f after ignition of the lamp. Current sensor $S_E$ is coupled to an input of circuit section SC. This coupling is shown in FIG. 1 by means of a broken line. Diode $D_1$ is shunted by a series arrangement of glow discharge starter $S_2$, a first lamp electrode $EL_1$ of lamp $L_A$ and coil $L_1$. In this embodiment, glow discharge starter $S_2$ constitutes a second switching element together with means for rendering the second switching element conducting and non-conducting. Coil $L_1$ constitutes an inductive element. One end of a second lamp electrode $EL_2$ is connected to an output terminal $K_6$ for connection of the lamp. A second output terminal $K_5$ for connection of the lamp is shown diagrammatically as a common point of the first lamp electrode $EL_1$ and coil $L_1$. Switching element $S_1$, circuit section SC, diode $D_1$, coil $L_1$ and output terminals $K_5$ and $K_6$ jointly constitute a DC-DC converter of the down-converter type.

The embodiment shown in FIG. 1 operates as follows.

If terminals $K_3$ and $K_4$ are connected to terminals of an AC voltage source, the circuit section RM generates a DC power supply voltage from an AC voltage supplied by the AC voltage source, which DC power supply voltage is present between the input terminals $K_1$ and $K_2$. Immediately after the circuit arrangement is put into operation, the glow discharge starter becomes conducting, while switching element $S_1$ is rendered conducting and non-conducting at frequency f by the circuit section SC. During the period when the glow discharge starter and switching element $S_1$ are conducting, a current flows from input terminal $K_1$ to input terminal $K_2$, via the glow discharge starter $S_2$, the first lamp electrode $EL_1$, coil $L_1$, switching element $S_1$ and current sensor $S_E$. During the period when the glow discharge starter $S_2$ is conducting and the switching element $S_1$ is non-conducting, a current flows from a first end of coil $L_1$ via diode $D_1$, the glow discharge starter and first lamp electrode $EL_1$, to a second end of coil $L_1$. The frequency f and the duty cycle with which the circuit section SC renders the switching element $S_1$ conducting are chosen to be such that the current in coil $L_1$ is a continuous current having a relatively high minimal amplitude.

Figure 2:
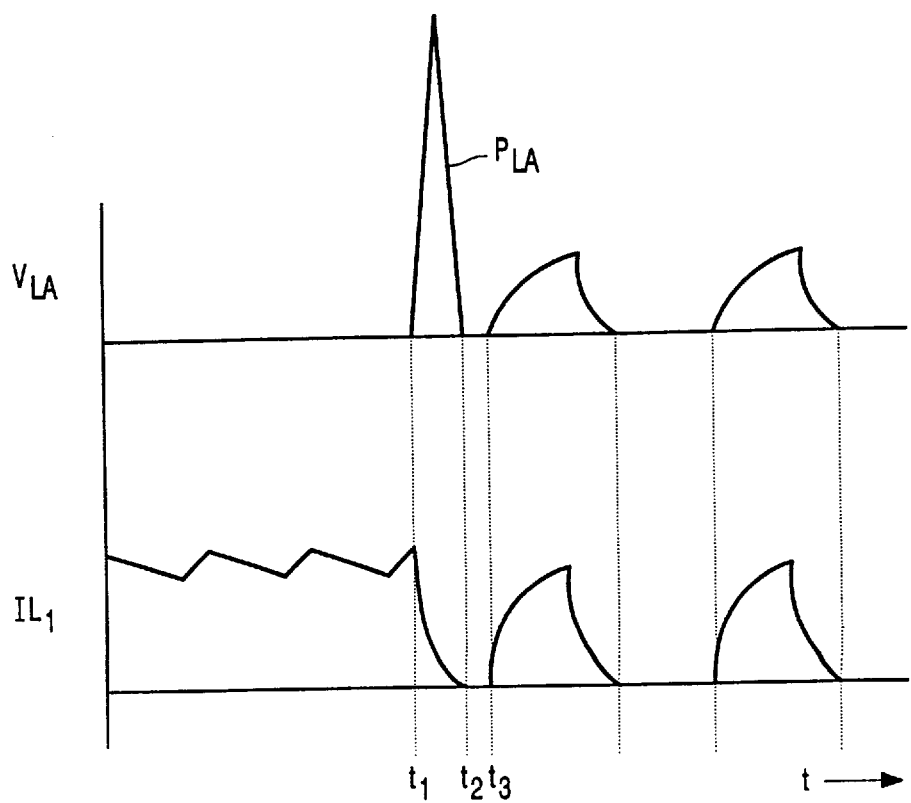
FIG. 2 shows diagrammatically the shape of a current and a voltage in the embodiment of FIG. 1 as a function of time.

Time is plotted in arbitrary units on the horizontal axis in the graph in FIG. 2. Current and voltage are plotted in arbitrary units on the vertical axis. In FIG. 2, the shape of the current in coil $L_1$ ($IL_1$) and the shape of the voltage across the lamp $L_A$ ($V_{LA}$) are shown as a function of time. The instant $t_1$ is the instant when glow discharge starter $S_2$ changes from the conducting to the non-conducting state. It can be seen that the current $IL_1$ for igniting the lamp has the shape of the sum of a DC current with a relatively large amplitude and an AC current with a relatively small amplitude. The coil $L_1$ thus conveys sufficient current at any instant so as to enable it to generate a sufficiently high ignition voltage pulse when the glow discharge starter becomes non-conducting. The voltage $V_{LA}$ across the lamp $L_A$ is substantially zero until the instant $t_1$. At the instant $t_1$, glow discharge starter $S_2$ becomes non-conducting so that an ignition voltage pulse $P_{LA}$ is generated across the lamp. Under the influence of this ignition voltage pulse, the lamp $L_A$ becomes conducting. The amplitude of $V_{LA}$ as well as the amplitude of the current through lamp $L_A$ (which is equal to the current through the coil $L_1$), decreases rapidly to zero at the instant $t_2$. The switching element $S_1$ is rendered conducting by the control circuit SC at the instant $t_3$. In this case, it is important that the time interval between the instant $t_2$ and the instant $t_3$ is relatively short to prevent that, in this time interval in which the lamp $L_A$ does not convey a current, substantially all charge carriers disappear from the plasma of the lamp so that the ignition process must start again. However, since the frequency f has a relatively high value, the time interval between the instant $t_2$ and the instant $t_3$ is relatively short so that a satisfactory take-over of the lamp $L_A$ is realized. If the current through the current sensor is approximately zero (which is the case for the first time at instant $t_3$) when the switching element $S_1$ becomes conducting, the circuit section SC decreases the frequency f at which the switching element $S_1$ is rendered conducting and non-conducting so that the DC-DC converter is operated in the discontinuous mode and the current in coil $L_1$ becomes zero in each high-frequency period, as can be seen in FIG. 2, after the instant $t_3$. The lamp is subsequently fed with this discontinuous DC current. The operating voltage of the lamp $L_A$ has such a value that this voltage does not bring about a glow discharge in the glow discharge starter, so that the glow discharge starter $S_2$ remains non-conducting after ignition of the lamp $L_A$.

It is possible to measure the lamp current with means which are not shown in FIG. 1 and to compare it with a reference value, and to adjust the frequency and/or the duty cycle of the switching element $S_1$ via the circuit section SC in dependence upon the result of this comparison. In this way, the amplitude of the DC current with which the lamp is fed is controlled at a substantially constant value.

It is also possible to provide the circuit arrangement with means, not shown in FIG. 1, which render the switching element $S_1$ conducting during stationary lamp operation, immediately after the current in coil $L_1$ has become zero. It is thereby achieved that the circuit arrangement functions efficiently during stationary operation.

Figure 3:
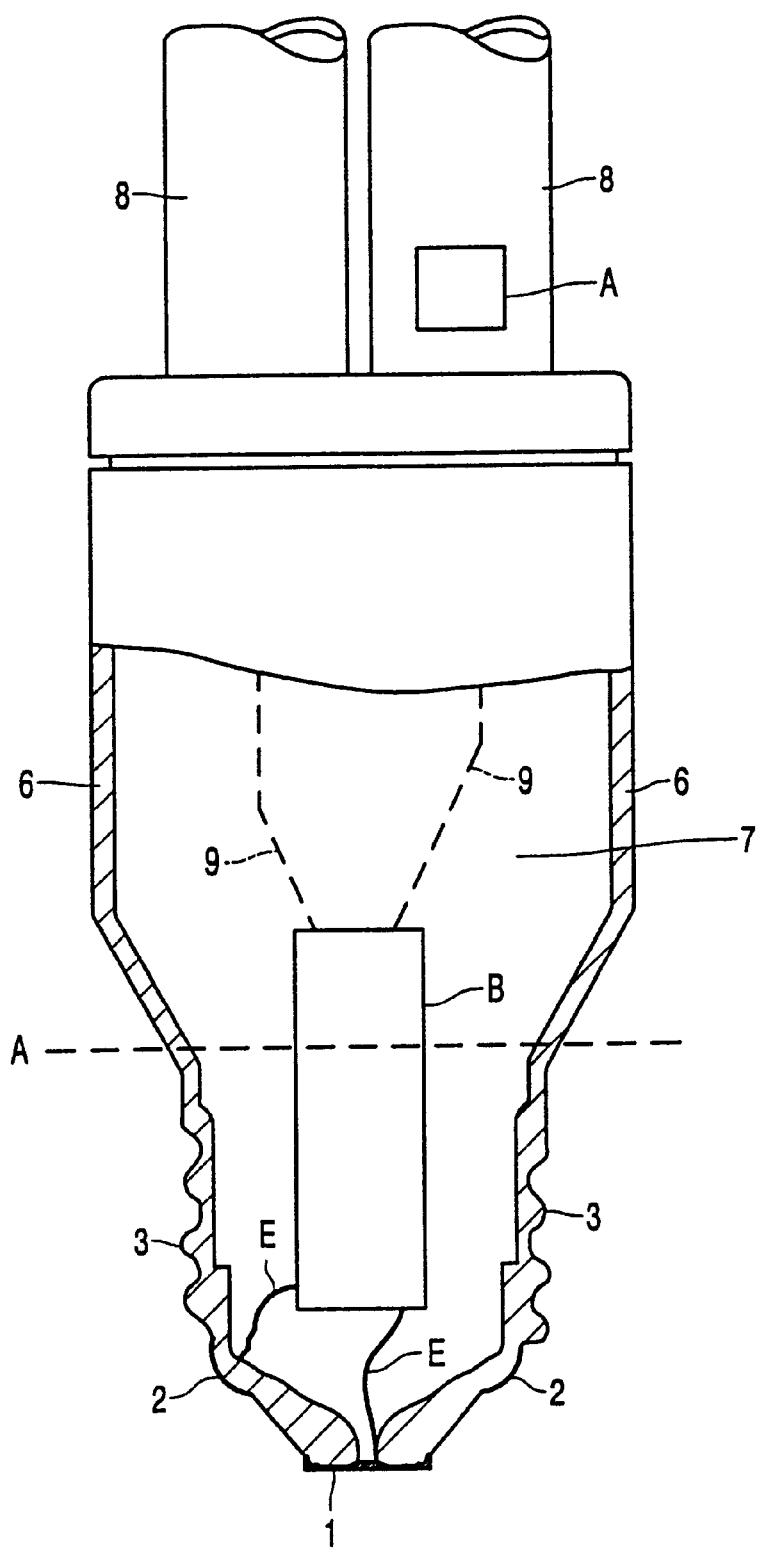
FIG. 3 shows a compact fluorescent lamp according to the invention.

In FIG. 3, the reference numeral 8 denotes a light-transmissive discharge vessel having a mercury and rare-gas filling and two electrodes (not shown). A luminescent coating is provided on the wall of the discharge vessel. The reference numeral 6 denotes a lamp housing which is secured to the discharge vessel 8, and the reference numeral 3 denotes a lamp cap provided with electric contacts (1 and 2) and secured to the lamp housing, while a ballast circuit B according to the invention is coupled between the contacts (1, 2) via the conductors E and the lamp electrodes (via conductors 9) for generating a DC lamp current from a power supply voltage.

What is claimed is:

1. A circuit arrangement for igniting and supplying a lamp with a DC current, comprising:
    input terminals for connection to terminals of a DC power supply voltage source,
    a DC-DC converter coupled to the input terminals and provided with
        an inductive element,
        a unidirectional element,
        a first switching element,
        a control circuit coupled to a control electrode of the first switching element for rendering the first switching element conducting and non-conducting at a frequency f,
    output terminals for connecting the lamp, and
    a first circuit which connects the output terminals during operation and comprises a second switching element rendered alternately conducting and non-conducting,
    characterized in that the control circuit includes a circuit section I for decreasing the frequency f after ignition of the lamp.

2. A circuit arrangement as claimed in claim 1, wherein the DC-DC converter comprises a down-converter.

3. A circuit arrangement as claimed in claim 1, wherein the unidirectional element comprises a diode in series circuit with the first switching element across the input terminals.

4. A circuit arrangement as claimed in claim 1, wherein the second switching element comprises a glow discharge starter.

5. A circuit arrangement as claimed in claim 1, wherein the first circuit comprises a lamp electrode.

6. A circuit arrangement as claimed in claim 1, wherein the first switching element is rendered conducting and non-conducting by the control circuit such that the inductive element conveys a continuous current before ignition of the lamp.

7. A circuit arrangement as claimed in claim 1, wherein the first switching element is rendered conducting and non-conducting by the control circuit such that the inductive element conveys a discontinuous current after ignition of the lamp.

8. A compact lamp comprising:
    a light-transmissive discharge vessel having a filling comprising a rare-gas, and two electrodes,
    a lamp housing secured to the discharge vessel,
    a lamp cap having electric contacts and secured to the lamp housing, and
    a ballast circuit coupled between the contacts and the electrodes for generating a lamp current from a power supply voltage,
    characterized in that the ballast circuit comprises a circuit arrangement as claimed in claim 1.

9. A compact lamp as claimed in claim 8, wherein the compact lamp is a compact fluorescent lamp.

10. A circuit arrangement as claimed in claim 1 wherein the first circuit connects the second switching element to the output terminals so that the second switching element is in parallel with a lamp when the lamp is connected to the output terminals.

11. A circuit arrangement as claimed in claim 3 wherein the inductive element is connected at one terminal thereof to a circuit point between the diode and the first switching element and at its other terminal to one of said output terminals.

12. A power supply circuit for operating a discharge lamp comprising:
    first and second input terminals for connection to a source of DC supply voltage,
    first and second output terminals for connection to the discharge lamp,
    a DC/DC converter coupled to the input terminals and to the output terminals, the DC/DC converter comprising;
        a first switching element and a diode coupled to the input terminals and an inductive element coupled to the first switching element and to a first one of the output terminals,
        a control circuit coupled to a control electrode of the first switching element for alternately driving the first switching element into conduction and nonconduction at a frequency (f) high enough to operate the DC/DC converter in a continuous conduction mode before ignition of a connected discharge lamp, a second switching element coupled to the output terminals, and means for controlling the switching frequency of the first switching element so as to reduce the switching frequency (f) after ignition of the connected discharge lamp.

13. The power supply circuit as claimed in claim 12 wherein the inductive element, the diode and the second switching element are arranged so as to generate a high ignition voltage for the connected discharge lamp upon start-up thereof.

14. The power supply circuit as claimed in claim 12 wherein, in response to a lower voltage across the output terminals when the connected discharge lamp is in operation, the second switching element is maintained in a non-conductive condition during stable operation of the connected discharge lamp.

15. The power supply circuit as claimed in claim 12 wherein, after ignition of the connected discharge lamp, the switching frequency controlling means controls the switching frequency of the first switching element to a reduced switching frequency such that the DC/DC converter operates in a discontinuous conduction mode whereby the connected discharge lamp is fed with a discontinuous DC current during stable operation of the lamp.

16. The power supply circuit as claimed in claim 15 wherein, at said reduced switching frequency after ignition of the lamp and during stable operation thereof, the inductive element carries a discontinuous current that periodically has a zero value for a finite time period.

17. The power supply circuit as claimed in claim 12 wherein, prior to ignition of a connected discharge lamp, the second switching element is alternately conductive and non-conductive whereby the inductive element generates a high ignition voltage pulse across the output terminals each instant of time that the second switching element becomes non-conductive.

18. The power supply circuit as claimed in claim 12 wherein, prior to ignition of a connected discharge lamp, the inductive element carries a continuous current of a value sufficient to generate a high ignition voltage pulse at any instant that the second switching element becomes non-conductive prior to lamp ignition.

19. The power supply circuit as claimed in claim 12 wherein the first and second switching elements and the inductive element operate so that prior to ignition the inductive element carries a continuous current comprising a large amplitude DC current modulated with a small amplitude AC current, and during stable lamp operation the inductive element carriers a discontinuous current with finite periods of zero current.

20. The power supply circuit as claimed in claim 12 wherein, prior to ignition of a connected discharge lamp, when the second switching element is conductive, the current flow through the second switching element also flows through the cathode electrode of the discharge lamp so as to preheat said electrode.

21. The power supply circuit as claimed in claim 12 wherein said means for controlling the switching frequency comprises a current sensing element in series with the first switching element and which controls the operation of the control circuit.

22. The power supply circuit as claimed in claim 12 wherein, prior to ignition of a connected discharge lamp, the first switching element is turned on and off at a higher frequency than the frequency at which the second switching element is turned on and off.

* * * * *